United States Patent [19]
Boblitz

[11] 3,770,225
[45] Nov. 6, 1973

[54] SAFETY SEAT-BELT AND SHOULDER-BELT RETRACTORS INCLUDING A PROGRAM METERING ELECTRICAL SWITCH

[75] Inventor: Oliver W. Boblitz, Washington, D.C.
[73] Assignee: Safety Systems, Inc., Washington, D.C.
[22] Filed: Oct. 7, 1971
[21] Appl. No.: 187,301

[52] U.S. Cl. ............................................ 242/107.4
[51] Int. Cl. ........................ A62b 35/02, B65h 63/04
[58] Field of Search .................. 242/107.4; 340/278; 297/384, 385, 386, 387, 388; 288/150 SB

[56] References Cited
UNITED STATES PATENTS
3,442,467   5/1969   Stoffel .............................. 242/107.4
3,506,305   4/1970   Eineman, Jr. et al ............... 297/388

*Primary Examiner*—Stanley N. Gilreath
*Assistant Examiner*—Jon W. Henry
*Attorney*—Solon B. Kemon et al.

[57] ABSTRACT

Safety seat-belt retractors are made with roller pawl means having the free-run direction in the belt retracting direction of the retractor and means biasing the rollers of the pawl means against movement into the no-run position, e.g., where the rollers are moved outwardly by a cam for the no-run position, a coiled spring ring biases the rollers inwardly against their outward movement into the no-run or locking position. With such a retractor, the seat-belt may be slowly moved either in or out for any distance of its length, e.g., when the occupant of the vehicle wishes to adjust position upon the vehicle seat, but the belt is instantly locked against extension (unrolling) if a quick pull is exerted upon it, e.g., where sudden deceleration of the vehicle would tend to throw the occupant of the seat forward. Such retractors provide emergency-locking and automatic unlocking and relocking. They may include electric switch elements that meter extraction length of the belt and signal proper belt fastening.

3 Claims, 23 Drawing Figures

PATENTED NOV 6 1973

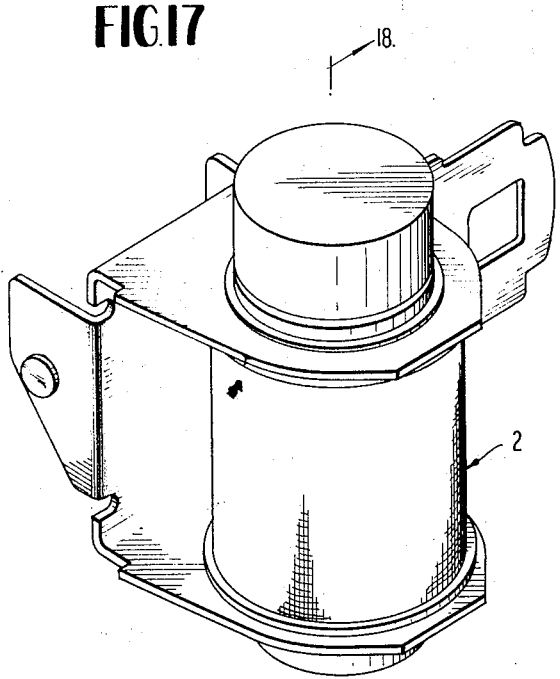
FIG.17
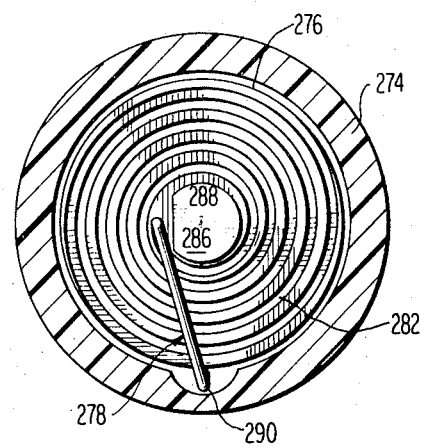
FIG.19
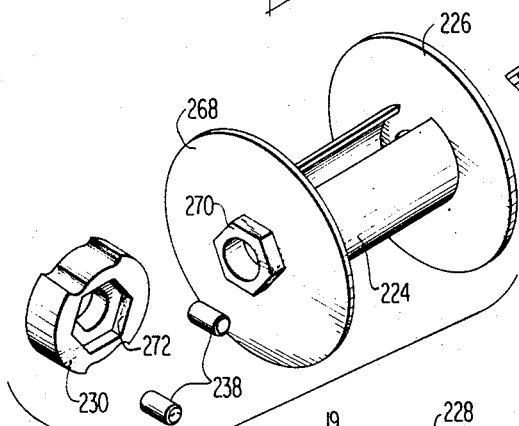
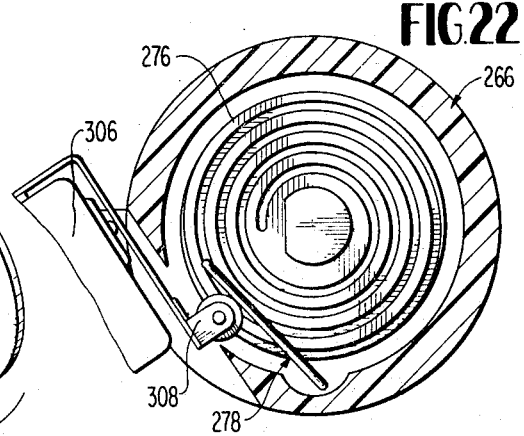
FIG.22
FIG.21
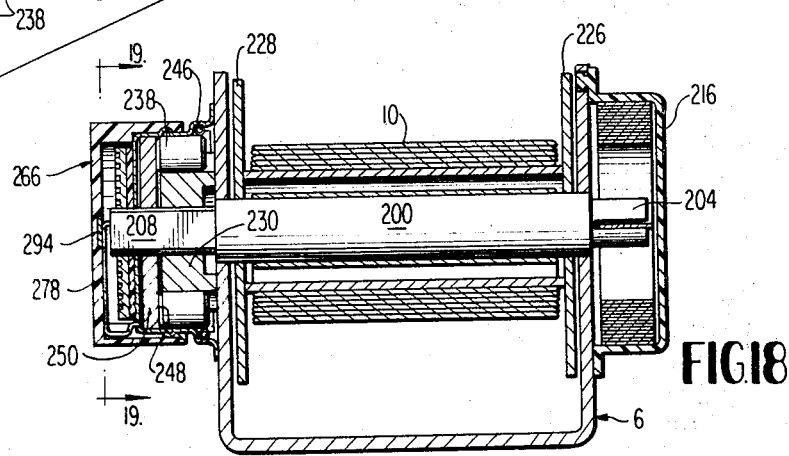
FIG.18

SAFETY SEAT-BELT AND SHOULDER-BELT RETRACTORS INCLUDING A PROGRAM METERING ELECTRICAL SWITCH

BACKGROUND OF THE INVENTION

1. Field of the Invention

The invention is concerned with retractors for safety seat-belts used in passenger vehicles, e.g., automobiles, trucks, airplanes, etc. More particularly, it relates to such retractors that are of the emergency-locking and automatic-unlocking and relocking (ELAUR) type, i.e., permit the user of the seat-belt to move the belt slowly in and out to adjust to normal body movements of the user, but substantially instantly lock the belt against extension as would be required to hold a vehicle occupant in the seat in case the vehicle is in a collision accident.

2. Description of the Prior Art

The utility of safety belts when properly installed in motor vehicles, including not only private passenger cars but also motor trucks, buses, airplanes and the like, to prevent serious injury or death to occupants of the vehicles has been sufficiently established to justify a large number of political jurisdictions to now require safety seat-belts to be standard equipment on vehicles. Nevertheless, there is a large segment of the public using vehicles, particularly passengers in private automobiles, who would rather risk the possibility of injury or death than subject themselves to the inconvenience of fastening a seat-belt about them and keeping it fastened during their passage in the motor vehicle.

Public officials and vehicle manufacturers have come to realize that methods must be devised to induce persons to use the seat-belt now required as equipment on motor vehicles. It is clear the mere presence of the seat-belts in the vehicle is not sufficient. If use of the seat-belts is not enforced by public law or some other effective means, the requirement for motor vehicles to have seat-belts as standard equipment will have little or no beneficial effect except possibly that of having increased employment as a result of manufacture of the seat-belts demanded by the legislation.

Parties concerned with motor vehicle safety and the problem of enforcing use of safety belts have devised numerous arrangements to try to persuade or enforce occupants of vehicles to fasten seat-belts and maintain them in a safe operating condition throughout passage in the vehicle. Improvements in the field of safety belts are, for example, disclosed and claimed in my prior U.S. Pats. Nos. 3,351,381; 3,381,268 and 3,504,336.

The United States Government has issued regulations (U.S. Standard No. 208) that will now require motor vehicles to have seat-belt systems that give an audio and visual indication as to whether the seat-belt of a seating position in the front seat of the motor vehicle occupied by a person has the seat-belt fastened about the seat occupant (35 F.R. 4600-4606).

Notwithstanding the clear recognition of the safety seat-belt use enforcement problems and the attempts of those concerned with safety to provide an adequate remedy, deficiencies exist in the known safety belt devices and systems so that the problem remains at this date. Ovbiously, expense it is an important consideration and any arrangement to be effective and to be acceptable to the automotive trade and law enforcement persons must be simple and very low in cost. Moreover, it must be compatible with existing seat-belt systems, i.e., it should not be limited to use only with newly installed seat-belt systems since this would avoid literally millions of existing motor vehicles. Variations in vehicle seating arrangements and seat constructions, particularly differences between front and back seats in automobiles, also demand that equipment of this type shall be adaptable to virtually any form of seating arrangement.

A variety of retraction devices have been developed and used for winding up sections of belts in seat-belt systems. Some of these simply serve to store the belt section when not in use, but do not play an active role in length adjustment of the belt (see U.S. Pat. No. 3,348,789). Others permit adjustment of the active length of the belt by the user. These are usually of a ratchet-type that automatically lock in stages as the belt is allowed to rewind upon a spring driven shaft (see U.S. Pat. No. 3,369,768). Such retractors, however, permit the belt to be relengthened only by unfastening it and then allowing the belt to retract completely until an "unlock" position is reached. Such retractors, therefore, tend to continually tighten and lock the seat occupant in an ever increasingly immobile position.

Safety seat-belt system that permit slow adjustment of belt length to be made without restraint, but which lock automatically to prevent belt extension when the belt is quickly moved are known. These belt systems may be broadly classified as the emergency-locking type. Some of the known retractors for such belt systems use inertia devices to operate cams or pawls to provide the emergency-locking function (see U.S. Pat. Nos. 3,335,974; 3,402,899; 3,442,467; 3,510,085; 3,558,075 and 3,578,260). Other emergency-locking retractors use ratchet-type mechanisms (see U.S. Pat. Nos. 3,504,953; 3,416,747; 3,421,605 and 3,476,333). Even pendulum elements (see U.S. Pat. No. 3,489,367 and 3,508,720) and permanent magnets (see U.S. 3,430,885) have been employed as elements to trigger locking safety belt retractors under emergency conditions. Some emergency-locking belt retractors once they have locked remain in the locked condition until unlocked. Others are designed to automatically unlock as soon as the force applied to produce the emergency-locking is released and to immediately relock if emergency conditions again occur. The present invention is concerned with this specific type of belt system which may be designated ELAUR, i.e., emergency-locking, automatic unlocking and relocking.

Obviously, any mechanism that is employed in a belt retractor device to provide emergency-locking must be totally reliable under all conditions. Some of the prior devices, however, do not function properly in certain positions. Others do not accommodate to the large number of different geometric arrangements demanded by variations in vehicle designs. Many of them are complicated and too expensive to attain acceptance by manufacturers in the highly competitive automobile industry. There exists, in spite of numerous developments in the field, a real need of improved safety seat-belt systems of the ELAUR type that are fully reliable under all conditions and positions of use, easy to manufacture and install and also are relatively inexpensive.

The use of shoulder or harness type safety belts is now preferred by many users of automobiles and any automatic arrangement for safety belts must be compatible with these shoulder or harness devices. The term "safety seat-belt system" as used herein and the accompanying claims is meant to include not only safety belt systems in which the belts fasten across the lap of the vehicle occupant, but also across the shoulders or other body portions. The term further comprehends any safety belt systems regardless of where they attach upon the motor vehicle, be it the side of the vehicle frame, the top of the frame, horizontal floor members, vertical rear or front seat members or any other sections of the vehicle having sufficient strength to secure and hold the belt in operative position.

OBJECTS

A principle object of this invention is the provision of new improvements in safety seat-belt systems. Further objects include the provision of:

1. Seat-belt retractors that provide emergency locking and automatic-unlocking and relocking (ELAUR) operation of improved design and, although very simple and inexpensive to make, are extremely efficient and reliable in use.
2. Safety seat-belt systems that comprise such retractors and electrical means to give visual and/or audio indication of proper fastening of seat-belts in a vehicle.
3. Such devices that are compatible not only with the new car market, but also the "after" market.
4. New indicator devices for use with safety seat-belts to meter payout of belt length and indicate proper fastening of seat-belts.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope of fair meaning of the appended claims.

SUMMARY OF THE INVENTION

These objects are accomplished, in part, according to the invention by providing seat-belt retractors with roller pawl means so associated with the roll-up shaft of the retractor that the free-run direction of the roller pawl means is in the belt retracting direction and further providing such roller pawl means with means biasing the rollers thereof against movement under slow unwind conditions into the non-run (lock) position. As a result of the invention, it is possible for the seat-belt to be moved slowly in and out of the retractor without restriction, e.g., to enable a seat occupant to adjust position, but if the speed of unwind of the belt is increased, e.g., where the seat occupant would be thrown forward in an accident, the retractor will instantly lock the seat-belt against any extension of the length of the belt. The design of the new belt retractors is such that the speed of unwind required to produce the emergency-locking many be varied over a wide range to thereby accomodate the retractors to particular regulations and differences in vehicles, e.g., automobiles vs. airplanes.

Safety seat-belt retractors in accordance with the invention will comprise a frame member by which the retractor may be mounted in a vehicle, a shaft whose rotation will cause a section of belt to wind up for retraction and spring means urging the shaft turn in a belt retracting direction. Preferably, the roller pawl means of the invention will comprise a plurality of rollers surrounded by a circular roller cage member having slots therein of the same number as the number of rollers, the slots being of such size as to admit a portion only of a roller, a pawl hub fixed, such as by being keyed, to the retractor shaft, the pawl hub having cam faces that are engaged by the rollers. The retractor further comprises a housing having a ring element that encircles a portion of the roller cage. When the pawl means is moved by rotation of the retractor shaft in the free-run direction, the pawl rollers are out of contact with the ring element of the housing, but when the pawl means is moved into a no-run position, these rollers are forced by the cam faces against the ring element of the housing thereby locking the retractor shaft against rotation in a direction in which the belt would unwind from the shaft.

Advantageously, the means biasing the pawl rollers against movement into the non-run position is a ring of coiled spring which encircles the roller cage of the pawl means and contacts the rollers through the slots in the cage. The size of the spring ring and the force which it exerts upon the rollers is selected so that the spring ring will be able to hold the rollers against movement by action of the cam faces of the hub into a no-run position when the belt retractor shaft is moved slowly in the belt extension direction but this spring and the force it exerts upon the rollers will not be so great as to prevent the rollers from being moved by the cam faces into a no-run position when the belt retractor shaft is moved quickly in the belt extension direction.

The objects of the invention are further accomplished by the provision of a variety of switch units which meter the amount of belt which is unwound from the belt retractor and provide autio and/or visual indication of the proper fastening of a seat-belt at a seat on which there is an occupant in the vehicle. As will be described in more detail hereinafter, the electrical belt metering switch units of the invention may take several forms which can be selected according to geometric limitations imposed upon retractors by the arrangements and conditions of installation in a vehicle. In one form, the switch units may be actuated by the spring motor which serves to wind the retractor shaft in a windup direction. In other embodiments, the switch units may be carried upon the opposite side of the retractor from the spring motor unit and be actuated by rotation of the belt shaft.

BRIEF DESCRIPTION OF THE DRAWINGS

A further understanding of the safety seat-belt retractors of the invention and their method of operation can be obtained by reference to the accompanying drawing in which:

FIG. 17 is a perspective view of a seat-belt retractor of the invention having a mounting frame and other elements different from that shown in FIG. 2.

FIG. 18 is a sectional side view taken along the line 18—18 of FIG. 17.

FIG. 19 is a sectional end view of switch means taken along the line 19—19 of FIG. 18.

FIG. 21 is an exploded view of a modification of a part of the retractor of FIG. 20.

FIG. 22 is a fragmentary end view of a modification of the switch means of FIG. 19.

DESCRIPTION OF PREFERRRED EMBODIMENTS

Figure 1:
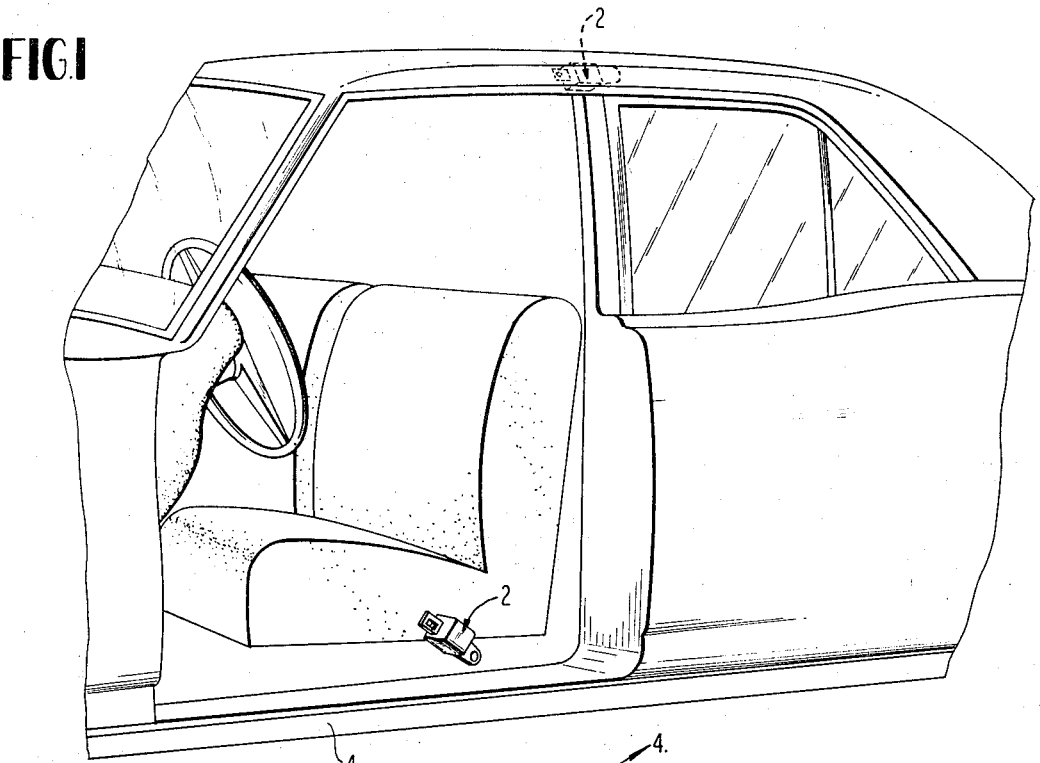
FIG. 1 is a fragmentary side view of an automobile which is provided with a seat-belt retractor in accordance with the invention.

Referring in detail to the drawings, belt retractors 2 of the invention may be mounted in a vehicle, such as automobile 4 in any desired location where there is a structural member of the vehicle with sufficient strength to secure and hold the retractor in an operative position and maintain it even under substantial force such as where a sudden load would be imposed by the weight of an occupant being thrust against the belt in an accidental collision of the vehicle. FIG. 1 shows one of the retractors 2 in a position beside the front seat of the automobile from which the belt may be extended for fastening across the lap of vehicle occupant and a second retractor 2 near the roof on a side post of the automobile from from which the belt may be extended for fastening across the shoulder or other body portion of the vehicle occupant.

Figure 2:
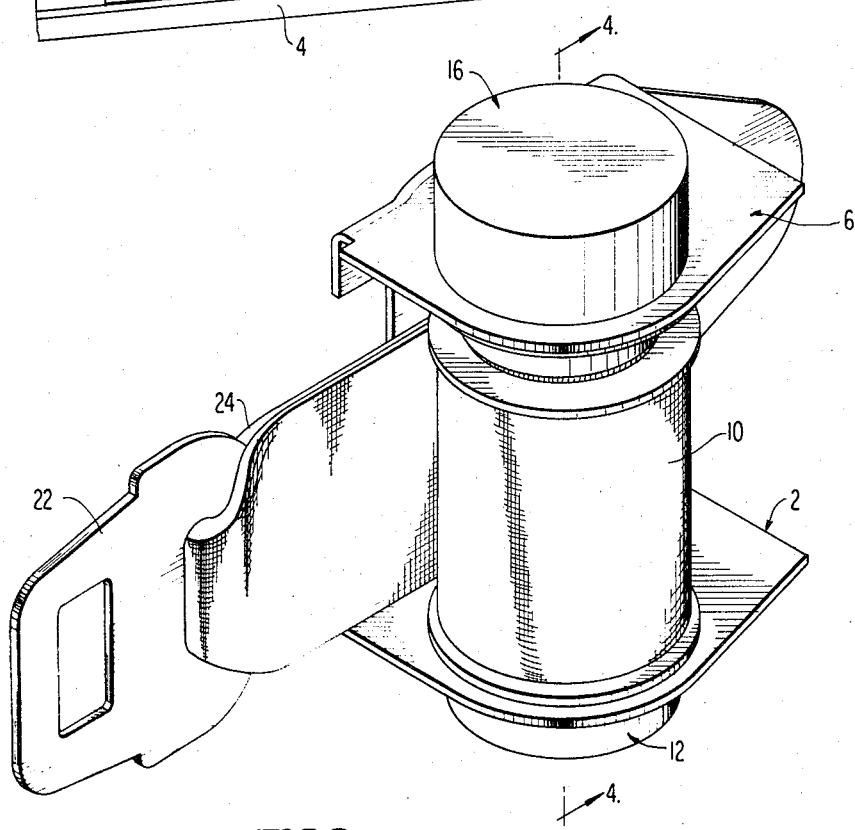
FIG. 2 is a perspective view of one form of seat-belt retractor of the invention.
Figure 3:
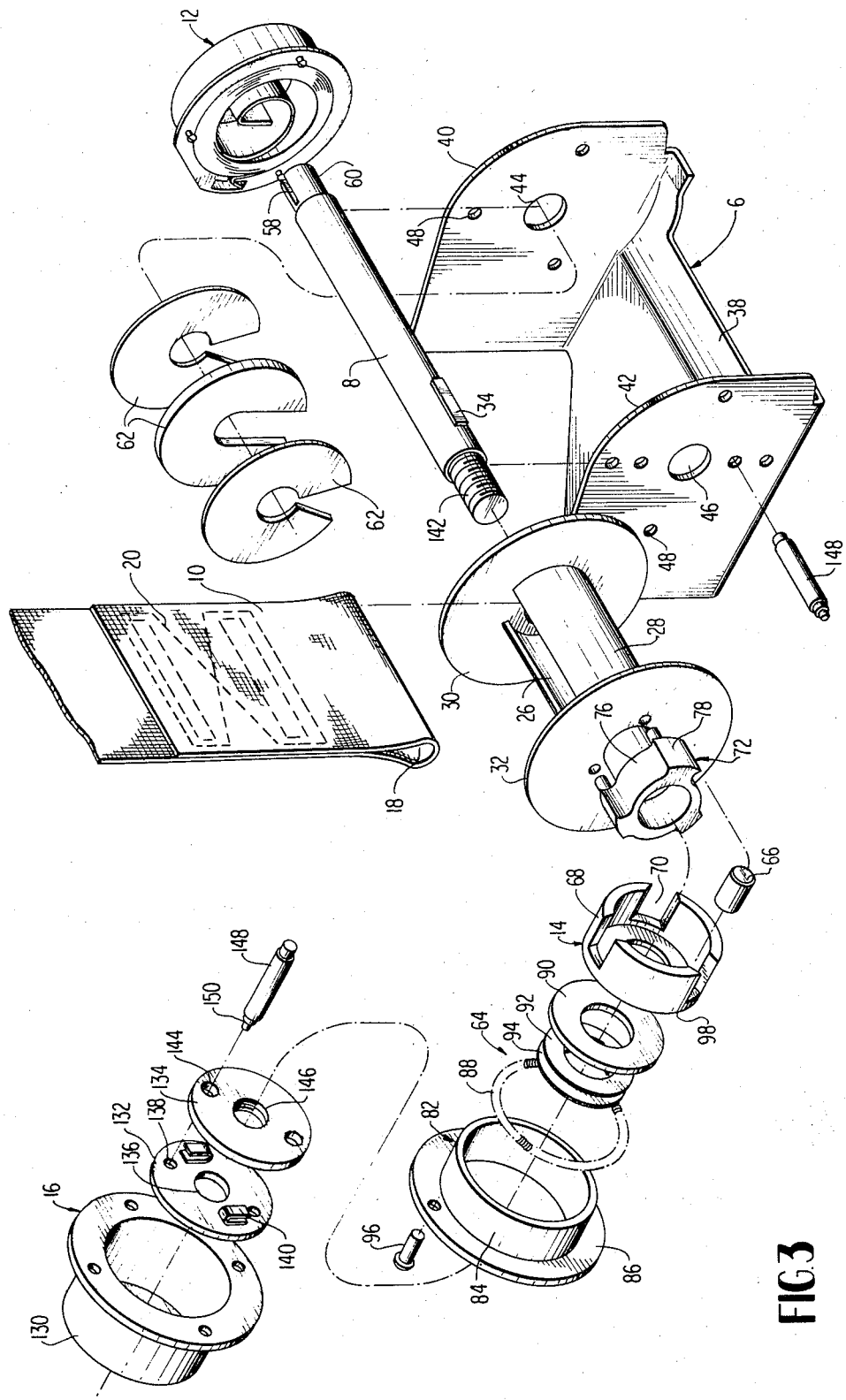
FIG. 3 is an exploded view of the seat-belt retractor of FIG. 2.
Figure 4:
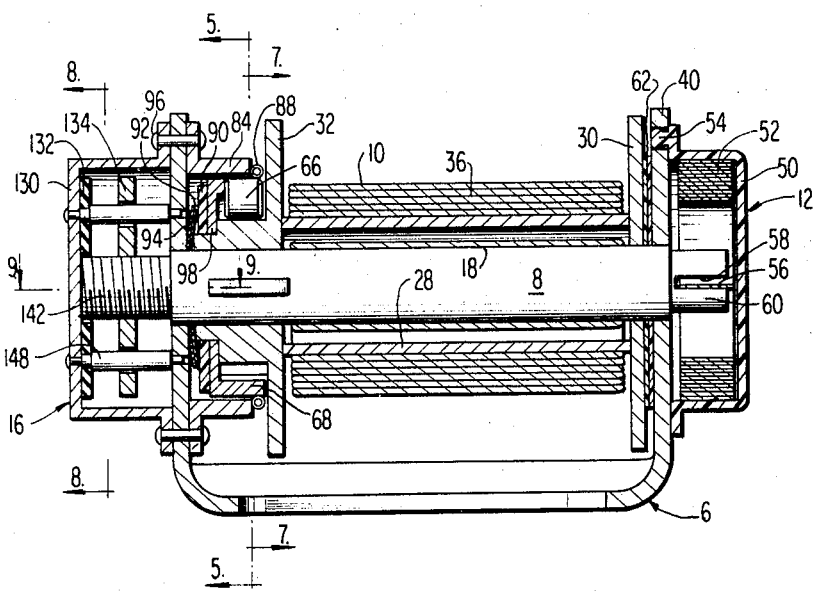
FIG. 4 is a side sectional view of the seat-belt retractor of FIG. 2 taken along the line 4—4 of FIG. 2.
Figure 8:
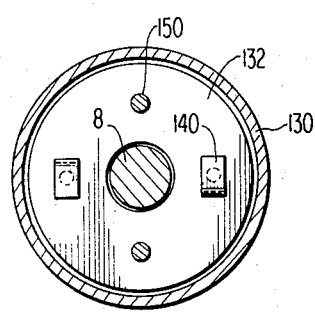
FIG. 8 is an end sectional view of the retractor of FIG. 2 taken along the line 8—8 of FIG. 4.

With particular reference to FIGS. 2-4, safety seat-belt retractor devices of the invention basically comprise a frame member 6 by which the retractor may be mounted in a vehicle, a shaft 8 which rotates to provide the winding action needed so the section of belt 10 is wound for retraction and spring means 12 which urges the shaft 8 to turn in a belt retracting direction. The retractors further comprise roller pawl means 14 and, may also include electrical switch belt metering means 16.

Figure 5:
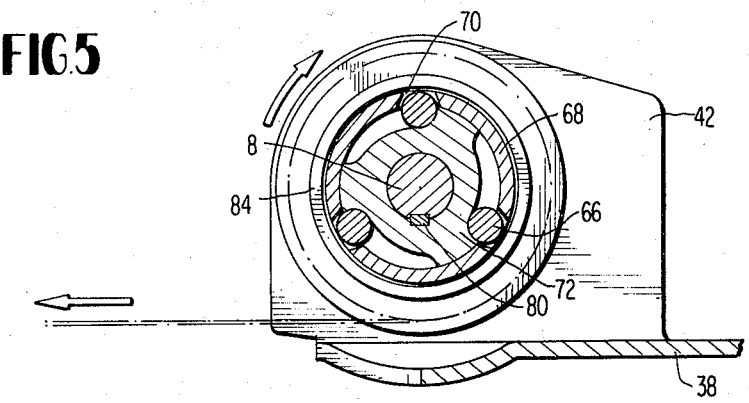
FIG. 5 is an end sectional view of the seat-belt retractor of FIG. 2 taken along the line 5—5 of FIG. 4 showing the rollers of the retractor pawl unit in the free-run position.

Many forms of seat-belt retractors have been developed and are in use which comprise frame members, belt windup shafts, spring motors and belts. These units may be used in providing retractors of this invention by modifying them so as to include roller pawl means of the type herein described and advantageously also electric belt metering switch units as described. Generally the known belt retractors will include a section of belt 10 in which a loop 18 is formed on one end by stitching 20 and a buckle member 22 is fastened by a second stitched loop 24 at the other end. When assembled (see FIG. 4) the loop 18 of the belt end extends through a slot 26 in the drum 28 so that the shaft 8 may extend through the belt loop 18. The drum 28 is provided with side flanges 30 and 32 to form an integral unit such as by welding the drum 28 to the flanges 30 and 32. The drum 28 is held against rotation relative to the shaft 8 by the key 34 and a mating key-way in the side flange 32. Rotation of the shaft 8 in a belt retracting direction (opposite the arrows in FIGS. 5 and 6) will cause the belt to roll up in concentric layers 36 upon the drum 28.

A typical frame member 6 for a belt retractor will comprise a base 38 and a pair of end members 40 and 42. These in turn will have holes 44 and 46 punched or drilled therein in which the shaft 8 may be journaled for rotation in either direction. The side members 40 and 42 will also have a plurality of small holes 48 drilled or punched therein at required locations to receive fastening pins, rivets or the like for assembly of other elements in the retractor as will be described below.

A typical spring means 12 for a belt retractor will comprise an end closure 50, a motor spring 52 and pins or rivets 54 for holding the spring means 12 to the side 40 of the frame 6. The motor spring 52 is coiled (see FIG. 4) within the end closure 50, the outside end of the spring coil being fixed to the closure 50 and the inside end 56 of the spring is bent radially so that it may slip into the slot 58 in the end 60 of the shaft 8. The motor spring 52 will thus urge the shaft to turn in a belt retracting direction to wind up the belt 10 upon the drum 28. When the belt is pulled out by the occupant of a seat in which the retractor is located, rotation of the shaft 8 by unwinding of the belt will cause the motor spring to coil more tightly thereby reducing the effective diameter of at least the inner coils of the motor spring. One or more washers 62 cut from fiber or plastic sheets may be fitted between the drum end flange 30 and the frame side 40 to insure that the flange 30 does not bind against the frame end 40 and maintain full operation of the retractor by action of the motor spring 52.

All of the elements described to this point constitute components which are standard in known safety seat-belt retractors. Their dimensions and structural arrangements can and will be varied to permit the retractors to take a multiplicity of sizes so that retractors can be made compatible with space limitations imposed by the particular vehicle upon which the belt retractor is to be mounted. The improvement in seat-belt retractors which is provided by this invention will now be described with reference to the specific embodiment of the retractor formed of frame member, shaft and other components as described above. It will be understood that the form of the invention improvement as described in detail constitutes only one of a variety of embodiments of the invention. Furthermore, the improvements of the invention are contemplated for modification of substantially any type of safety seat-belt retractor known to the art which encompasses a frame member, a shaft which is rotated to cause a section of belt to wind up for retraction and spring means urging the shaft to turn in a belt retracting direction.

The roller pawl means 14 constitutes an essential element of improved belt retractors provided by the invention. In turn, means 64 for biasing the roller pawl means 14 against movement into a no-run position constitutes an essential portion of roller pawl means to be used in forming the new belt retractors.

Roller pawl devices for the invention may take a variety of forms. However, invariably they will be designed to have a plurality of rollers which can assume an unlocked or free-run position (see FIG. 5) but be forced into a locked or no-run position (see FIG. 6) by means of some suitable cam unit. Basically, a roller pawl means 14 will comprise a plurality of rollers 66 and a circular roller cage member 68 having slots 70 cut therein in number to correspond at least to the number of rollers 66 in the pawl means 14. The slots 70 are of such size that they admit a portion only of a roller (see FIG. 6). Within the roller cage member 68 there is a pawl hub 72 that comprises an annular side extension 74, cam faces 76 and annular bearing faces 78. The annular faces 78 journal the roller cage member 68 for rotation about an axis which is concentric with the longitudinal axis of the shaft 8. The pawl hub 72 is fixed upon the shaft 8 by key 80 so that the hub 72 will rotate with the shaft 8.

The pawl means 14 additionally comprises a housing 82 having a ring element 84 which is integral with a side flange 86. The ring element 84 circles (see FIG. 4) a portion of the circular roller cage 68 as well as a portion of the rollers 66. When the roller pawl means 14 is in the free-run position (see FIG. 5) the rollers 66 are out of contact with the ring element 84. On the other hand, when the roller pawl means is in the no-run position, cam faces 76 force the rollers 66 into contact with the ring element 84 and cause the device to be locked against rotation relative to the frame 6. In turn, the shaft 8 being keyed to the hub 72 is also locked against rotation relative to the frame 6.

The means 64 biasing the roller pawl means against movement into the no-run position comprises a coiled spring annulus, specifically the ring 88 formed to coiled spring, a fiber washer 90 and two metal spring washers 92 and 94. The spring ring 88 encircles the roller cage 68 beyond the inner edge of the ring element 84 and bears upon the rollers 66 across the open areas provided by the slots 70. Consequently, the spring ring 88 biases the rollers 66 against movement into the no-run position in which they are locked against the inner surface of the ring element 84. As can be seen by reference to FIG. 4, the ring element 84 is fixed relative to the frame member 6 by means of rivets of pins 96 which extend through holes 48 in the frame side member 42 and through the flange 86 of the housing 82.

The pressure exerted upon the rollers 66 by the ring spring 88 is balanced relative to the pressure exerted by the spring washers 92 and 94 upon the fiber washers 90. The washer 90 is in frictional engagement with the radially extending face portion 98 of the roller cage 68. As soon as the fractional engagement between the washer and radial face 98 imposed by the spring washers 92 and 94 is overcome, relative movement between them can occur. It is the counterbalance of this frictional force against the compressive force exerted by the spring 88 on the rollers 66 which enables the roller pawl means to remain in a free-run condition when the belt 10 is only slowly extended from the retractor but which permits the roller pawl means to instantly assume the no-run position and lock the belt against extension as soon as a quick unwinding of the belt is attempted. This no-run position is maintained so long as the tension associated with the quick extension of the belt is maintained. However, as soon as this tension is relaxed the ring spring 88 will retract the rollers to a free-run position and the belt retractor automatically unlocks permitting the belt to again be unwound from the retractor provided that is is done at a slow speed. If a quick jerk is again imposed upon the belt, instantaneous locking again occurs. This operation can be repeated time and time again. If the occupant of a vehicle equipped with a safety seat-belt system in accordance with the invention has the seat-belt properly buckled across the lap or other body portion, when such operator makes slow body movements such as in shifting from one position to another or making a normal movement to reach across the automobile to open a door, the belt will unroll from the retractor and permit free movement of the vehicle occupant. However, should such occupant make a quick movement such as would occur if the vehicle was involved in an accidental collision with another object, the retractor would immediately assume the no-run condition and lock the belt against extension until the tension applied by the quick movement was released.

Figure 6:
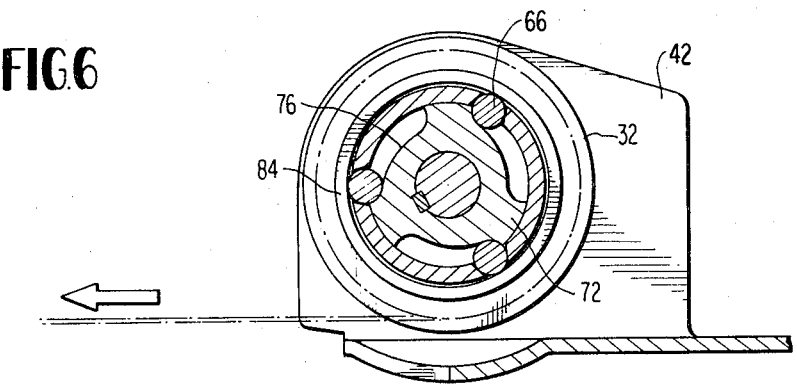
FIG. 6 is a side sectional view corresponding to FIG. 5 but showing the rollers of the retractor pawl unit in a no-run position.
Figure 7:
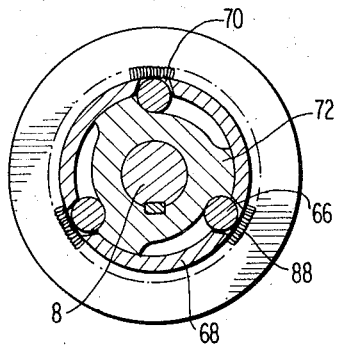
FIG. 7 is an end sectional view of the retractor of FIG. 2 taken along the line 7—7 of FIG. 4.
Figure 10:
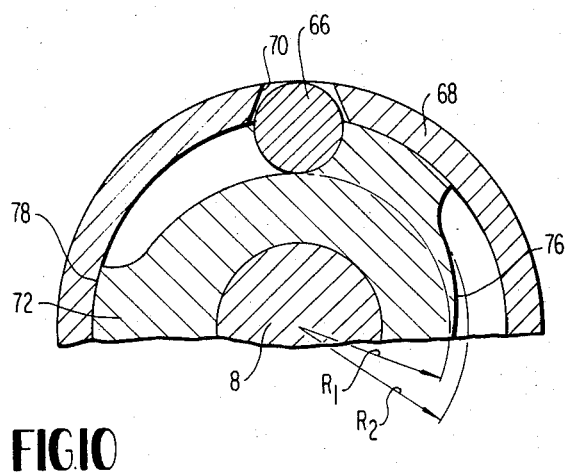
FIG. 10 is a fragmentary enlarged end sectional view of a portion only of FIG. 5.

The roller pawl means of the invention provides the emergency-locking with automatic-unlocking and relocking in the following manner. When the shaft 8 rotates in a direction to wind up the belt 10 and retract it, the shaft 8 and pawl hub 72 will rotate in a direction opposite to the arrows in FIG. 5. As can be seen from FIG. 10, the rollers 66 will assume a retracted position upon the low point of the cam face 76, i.e., a radial distance $R_1$ out from the concentric axis of the shaft 8 and the pawl hub 72. The ring spring 88 which exerts a small amount of pressure upon the rollers 66 will tend to hold the rollers in this retracted position. When the shaft 8 is rotated in the direction of extension of the belt 10 as indicated by arrows in FIGS. 5 and 6, and the roller cage 68 does not correspondingly rotate, the cam faces 76 will cause the rollers 66 to extend into a locking position as shown in FIG. 6, i.e., the rollers will move outwardly to the radial distance $R_2$ which is defined by the outer extension of the cam face 76. This brings the rollers 66 through the slots 70 into locking engagement with the ring element 84. The ring cage 68 is only partially free to rotate in either direction with the shaft 8 and the hub 72, i.e., there is frictional engagement between the radial face 98 of the roller cage 68 and the washer 90 produced by the action of spring washers 92 and 94. If the extension of the belt is done slowly sufficient slippage can occur between the washer 90 and the radial face 98 so that the biasing action of the coiled spring 88 (see FIG. 7) will not be overcome and roller cage 98, and in turn the rollers 66 will rotate with the hub 72 and the shaft 8. Hence, with such slow belt belt extension, the roler pawl means remains in a free-run position. On the other hand, if there is a rapid pull or jerk imposed upon the belt 10, the slippage will not occur between the washer 90 and the radial face 98 to a sufficient extent to overcome the biasing action upon the rollers 66 of the spring ring 88. Consequently, the roller cage 68 will remain stationary relative to the shaft 8 and the hub 72. Hence, cam face 76 moves the rollers to the radial extension $R_2$ and the rollers lock in a no-run position.

Figure 12:
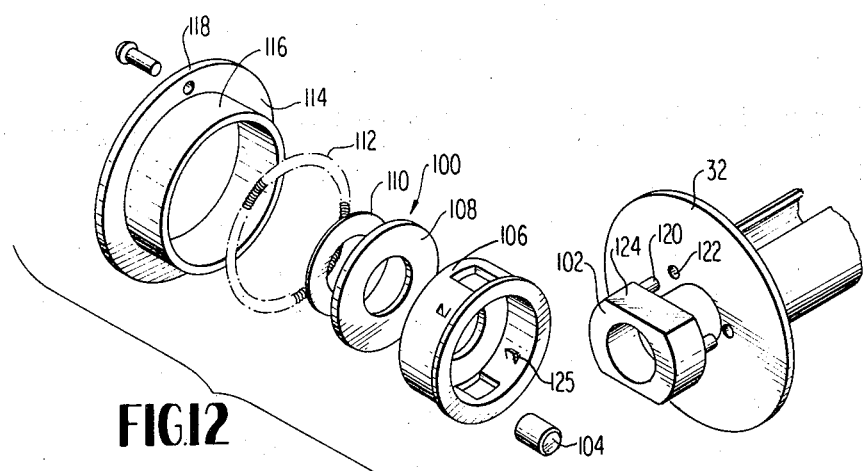
FIG. 12 is an exploded fragmentary perspective view of another embodiment of a roller pawl means for use in belt retractors of the invention.

FIG. 12 illustrates another embodiment of roller pawl means for use in belt retractors of the invention. It is well known in the automotive industry that any appliance or piece of equipment used on an automobile should be as simple and as inexpensive as possible to make so long as it will accomplish its designed purpose. Tolerance between parts should be as loose as possible so long as the various parts cooperate to produce the desired result. Additionally, the number of parts should be held to a minimum not only to reduce the cost of manufacture but also to improve upon the ease of assembly. The construction of the roller pawl means 100 shown in FIG. 12 represents another embodiment for retractors of the invention to be used with automobiles designed to meet these requirements.

The roller pawl means 100 comprises a hub 102, a pair of rollers 104, a roller cage 106, a fiber washer 108, a metal spring washer 110, a ring of coiled spring 112 and a housing 114 which includes a ring element 116 and a radially extending flange 118. The hub 102 is formed separately from the drum side 32 but is fixed relative to the side by a pair of pins 120 that extend from the hub 102 through holes 122 in the drum 132.

The roller pawl means 100 comprises less parts and is more easy to assemble than the roller pawl means 14 shown in FIGS. 3–7. Nevertheless, it includes the same basic elements and operates in the same manner. The hub 102 can be cut from bar stock and the cam faces thereon 124 can be formed such as by milling or grinding much easier than the more complex cam faces 76 on the hub 72. Still the hub 102 operates effectively to move the rollers from a free-run position into a no-run position under the effective control of the biasing spring ring 112 and the frictional elements 108 and 110. Extent of movement of the rollers 104 in the free run position is limited by the stop 125.

Figure 20:
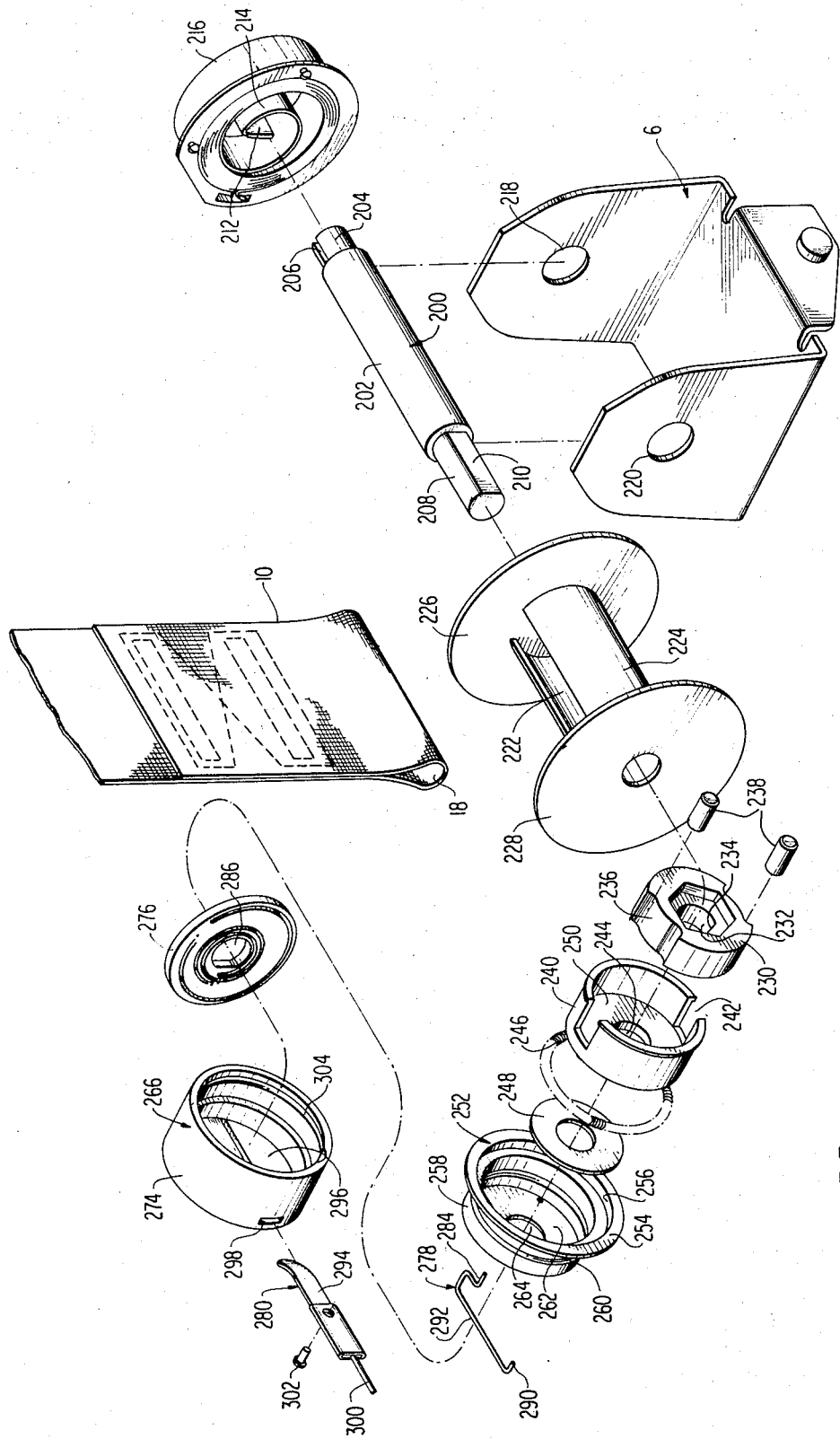
FIG. 20 is an exploded view of the retractor shown in FIGS. 17-19.

The retractor 2 of FIGS 17, 18 and 20 because of its minimum number of parts and ease of production is a preferred embodiment of the new retractors of the invention. Its shaft 200 comprises the center portion 202, motor end 204 with slot 206; other end 208 having a flat segment 210. Radial extension 212 of motor spring 214 coiled within the casing 216, fits into slot 206 so that shaft 200 is continually urged in the belt windup direction by the motor spring 214.

The shaft 200 is journaled on ends 204 and 208 in circular holes 218 and 220 respectively of the frame 6. The loop 18 of belt 10 passes through the slot 222 of the drum 224 and encloses shaft portion 202. Rotation of shaft 200 therefor causes belt 10 to roll up on the drum 224 between the end plates 226 and 228.

The hub 230 has the central hole 232 that slips over the shaft end 208 with a flat 234 that mates with flat 210 thereby keying the hub 230 to the shaft 200. Hub 230 includes a pair of cam faces on which the rollers 238 ride. The roller cage 240 envelopes the hub 230 and rollers 238 extend partial through the slots 242. The end 208 of shaft 200 extends through the hole 244 of cage 240.

Garter spring 246 encircles cage 240 and presses against rollers 238 where they extend beyond cage 240 through the slots 242. Plastic washer 248 follows cage 240 on the end 208 of shaft 200 and bears against the radial face 250 of cage 240. In turn, housing 252 encloses washer 248, spring 246 and cage 240. The housing 252 includes a radial inner flange 254, concentric offset portion 256, central cylinder portion 258 having a ridge 260, outer radial face 262 and cental hole 264. In the assembled portion, shaft end 208 extends through hole 264 and the ring spring 246 is contained by the offset portion 256.

The retractor also carries a switch unit 266 whose construction and operation is described later.

An alternative method of fixing the hub 230 relative to the shaft 200 is illustrated in FIG. 21. The drum 224 has a side 226 as in FIG. 20, but the opposite side 268 has a hex-member 270 fixed to its outer face. The member 270 fits into the hex-shaped depression 272 in the hub 230 so the hub rotationally locked to the drum 225 and in turn to the shaft 200.

Regardless of whether the arrangement of locking together hub 230 and shaft 200 as in FIG. 20 or FIG. 21 is used, the assembly of hub 230, cage 240, rollers 238, spring 246 and washer 248 is held together in position by the housing 252. The housing 252 must be fixed, such as by welding, blind rivets or other fasteners, with sufficient strength to withstand the torque forces that will be imposed by emergency-locking of the retractor in the event of collision of the vehicle carrying the seatbelt systems. When there is collision speed extension of the belt 10, the rollers 238 will be forced by cam faces 236 overriding the biasing effect of ring spring 246 and the action of washer 248 (as explained previously) into locking engagement with the cylinder portion 260 of the housing 252. Since housing 252 is fixed to the frame 6, the locking of rollers 238 will correspondingly lock shaft 200, drum 224 and belt 10 against any extension of the belt. This condition will remain as long as the tension remains on the belt. However, as soon as the tension on the belt is released, sufficiently to allow motor spring 214 to rewind the belt 10 to any extent whatever, ring spring 246 will cause rollers 238 to disengage housing portion 260 and automatic-unlocking of the retractor will occur. Should emergency type tension again be applied to the belt 10, automatic relocking will instantly occur in the same manner by action of hub 230 and cam faces 236 upon the rollers 238. Since many road accidents of automobiles involve multiple collisions, e.g., impact with a first vehicle, then with a second vehicle and perhaps even a tree or building, instant and automatic relocking is a vital requirement of an effective emergency-locking seat-belt system.

Operation of the rollers in any of the pawl means of the invention as to the speed of belt movement to produce emergency-locking and automatic-unlocking can be controlled over wide limits by variation of one or more of the following parameters:
1. Amount of pre-set of motor spring.
2. Compressive force of garter spring.
3. Degree of engagement of frictional washer with roller cage.
4. Shape of roller cam faces.

These parameters may be varied to meet different requirements of the various vehicles and applications for which the new seat-belt systems of the invention will be employed.

DISCUSSION OF ADDITIONAL EMBODIMENTS

In many countries, seat-belts are not required components of motor vehicles. In a few countries they are required accessories, but signaling devices or other indicators of proper use of the seat-belts by vehicle occupants are not required. In contrast, by recent regulations issued by the Federal Government, new automobiles sold in the U. S. after Jan. 1, 1972, will be required to have seat-belt systems which meter the length of belt unwound from a seat-belt retractor and until the belt has been extended by a minimum amount. The indicator device must produce an audio and visual signal indicating that the seat-belt on the front seat of the automobile occupied by a passenger has not been properly fastened. The present invention provides several modifications of electric switch units which may be associated with the new seat-belt retractors to provide the belt metering and indicating functions as required by the Federal regulations. Some of these embodiments are advantageous from the viewpoint of accuracy of metering of length of extension of belt from a retractor. Others are advantageous from the view point of compactness or their ability to be adjusted over wider limits of belt extension and seat-belt system operation.

One embodiment of programmed metering switch unit of the invention can be described by reference to FIGS. 2-9. The switch unit 16 comprises a housing 130, a stationary contact number 132, and a movable contact member 134.

The disc 132 is formed of electrically non-conductive materials such as plastic, has a central hole 136, pair of side holes 138 and a pair of electrodes 140 which are in the form of U-shaped spring members fastened by one leg to the disc 132. The hole 136 is unthreaded and just sufficiently large to slip over the threaded end 142 of the shaft 8.

Disc 134 is made of electrically conductive material such as a metal washer and is provided with a pair of side holes 144 and a central hole 146 which is threaded to mesh with the threads on end 142 of the shaft 8.

A pair of pins 148 extend through the holes 138 and 144 being fastened such as by peening at one end to the cover 130 and at the other end through holes in the side 42 of the frame 6. The holes 138 are only large enough to fit over the reduced shoulder 150 on the pins 148 so the disc 132 remains stationary in the switch assembly. On the other hand, the holes 144 are large enough that the disc 134 may slide back and forth upon the pins 148. This occurs as the belt is wound in and out upon the drum 28 since this, in turn, turns the shaft 8 causing the threads upon end 142 to produce the reciprocating motion in the disc 134.

An electrical circuit is formed through the switch means 16 by connecting both of the electrodes 140 to the hot-side of the battery system of the vehicle. The other side of the battery system is, of course, connected to ground which will cause the electrically conducting disc 134 to form the otherelectrode of the switch circuit by way of the shaft 8 and the frame member 6. The arrangement of threads on the end 142 and the hole 146 is such that as the belt 10 is extended from the retractor, the disc 134 will be caused to move away from the disc 132. There will be placed in series with the lead from the electrodes 140, audio and/or visual indicators (not shown) such as a light and buzzer. As the belt is withdrawn from the retractor and the disc 134 moves away from disc 132, there will come a time when contact between the disc 134 and the electrodes 140 terminates. This will break the electric circuit to the indicator means, e.g., the light will be turned off and the buzzer will cease to sound. The length of belt which is required to be withdrawn from the retractor in order to produce this indication of extension to a certain length of the belt 10 can be controlled in a number of ways. For example, the pitch and number of threads on the end 142 can be varied, the position of the disc 134 can be varied when the unit is assembled, the amount of spring action in the U-shaped electrodes 140 and the distance between the legs can be varied and in other ways a great variation in control of the operation of the switch means 16 can be obtained in order to accommodate it to the demands required for a particular seat-belt system. A single electrode 140 would suffice, but two are advantageous to produce a balanced contact with the disc 134 and insure reliable operation.

Figure 11:
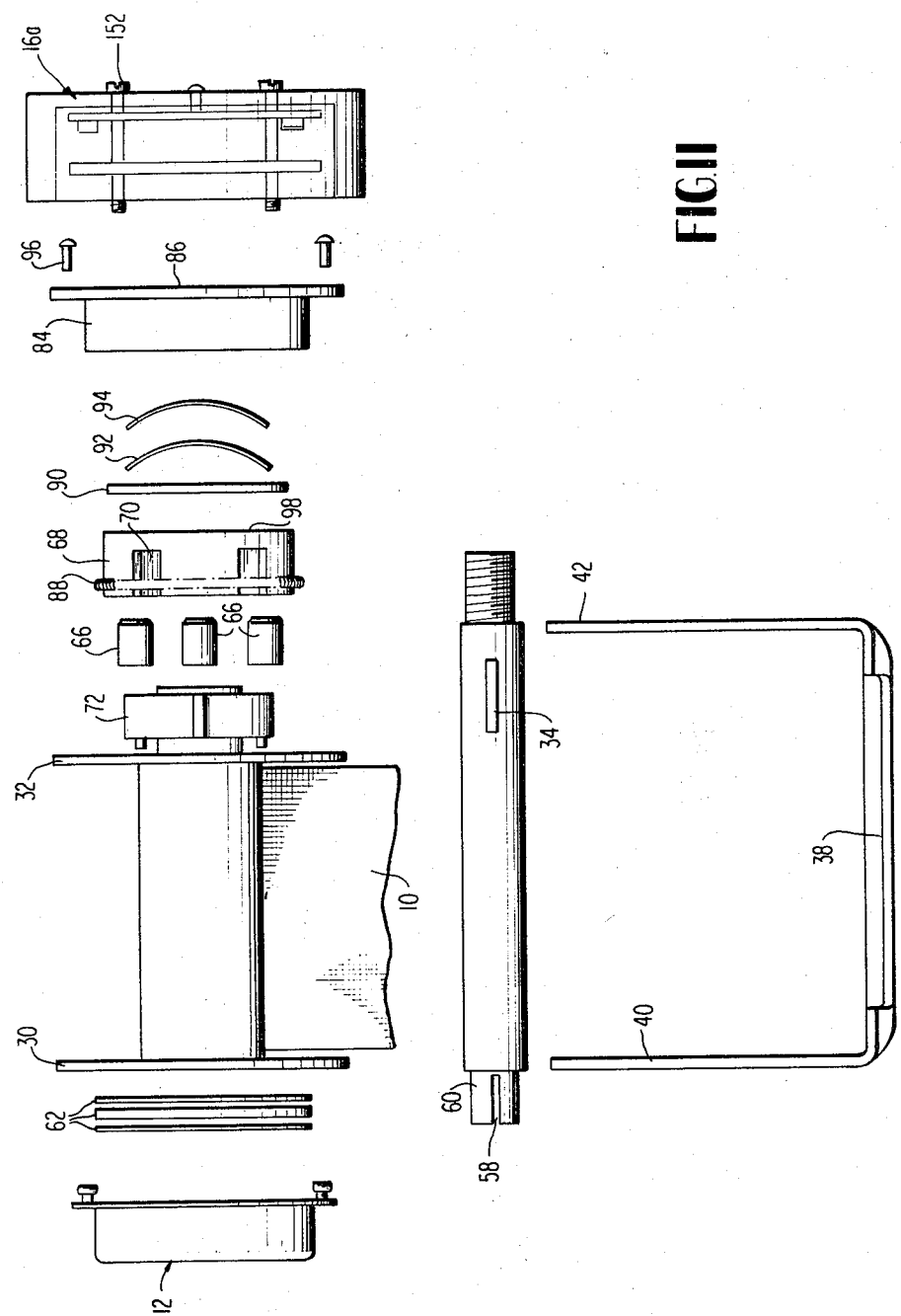
FIG. 11 is an exploded side view illustrating the various components which form the retractor unit of FIG. 2.

A slightly different version of a similar switch unit 16A is illustrated in FIG. 11. Here, machine screws 152 are used to hold the switch unit to the belt retractor instead of permanently fixed pins 148. Such an arrangement would be advantageous where frequent servicing or readjustment of the distance of belt extraction for switch operation would be required.

Figure 15:
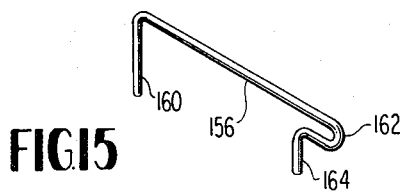
FIG. 15 is a perspective view of the pivoted operating arm of the switch unit of FIGS. 13 and 14.
Figure 13:
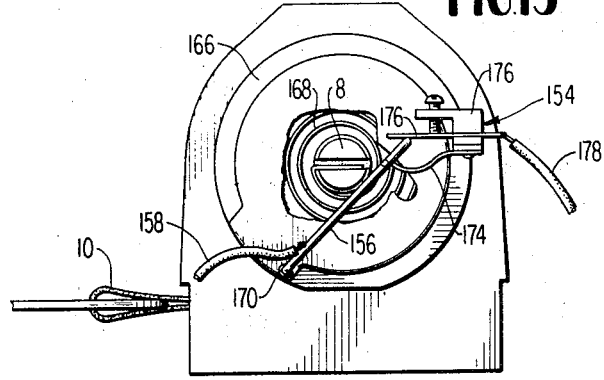
FIG. 13 is an end view with a portion broken away of one form of belt extension metering switch in accordance with the invention showing the position of the switch when the seat-belt is in a fully retracted position.
Figure 14:
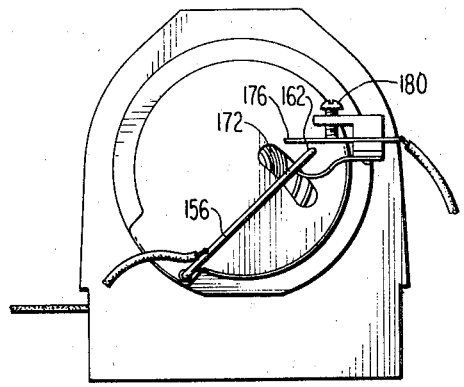
FIG. 14 corresponds to FIG. 13 but shows the seat-belt metering switch in a position where the seat-belt has been withdrawn a substantial distance from the belt retractor.

Another form of switch unit for use in connection with the invention is illustrated in FIGS. 13-15. This unit utilizes the coiling action of the motor spring 52 to perform the make and break operation of the switch.

The switch 154 comprises a switch arm 156 and an electrical lead 158 electrically connected to the arm 156. The arm 156 is formed of metal wire or bar in the shape shown in FIG. 15 to include a leg 160 at one side, a U-shaped portion 162 at the other side from which the leg 164 depends. The casing 166 for the motor spring 168 includes a small hole 170 in the outer facing of the casing and the leg 160 extends through this hole to form a pivot for the arm 156. The other leg 164 extends into one of the concentric coils of the motor spring 68 through a slot 172 in the outer face of the casing 166. When the belt 10 is fully withdrawn into the retractor, the coils of the motor spring 168 are as separated as possible away from the shaft 8. This permits the metal leaf spring 174 carried by the lug 176 of electrically insulated material to push the end 162 of arm 156 against the electrical contact member 176 which is electrically connected to the wire lead 178. Accordingly, a signal light buzzer or other indicator means electrically connected in series with the wire leads 158 and 178 would be energized giving an indication that the seat-belt was in unfastened or improperly extended condition.

When the belt had been extended to the distance required for proper fastening around the lap or body portion of a person of minimum size, the compression of the coils of motor spring 168 (see FIG. 14) will cause the end 162 of arm 156 to withdraw from the contact member 176. Accordingly, the light, buzzer or other indicating device in series with the electrical leads 158 and 178 will be deenergized thereby indicating a proper fastening of the seat-belt.

The distance needed for the belt 10 to be withdrawn from the retractor before this switch unit will deenergize the signal system can be controlled in a number of ways in order to provide adjustment in length of the belt required to produce the indication. The adjustment screw 180, for example, can be moved inwardly or outwardly to control the point of contact between the end 162 of the arm 156 and the contact member 176. Alternatively, in assembling the switch unit to the retractor, the leg 164 can be inserted between different concentric coils of the motor spring 168.

Figure 16:
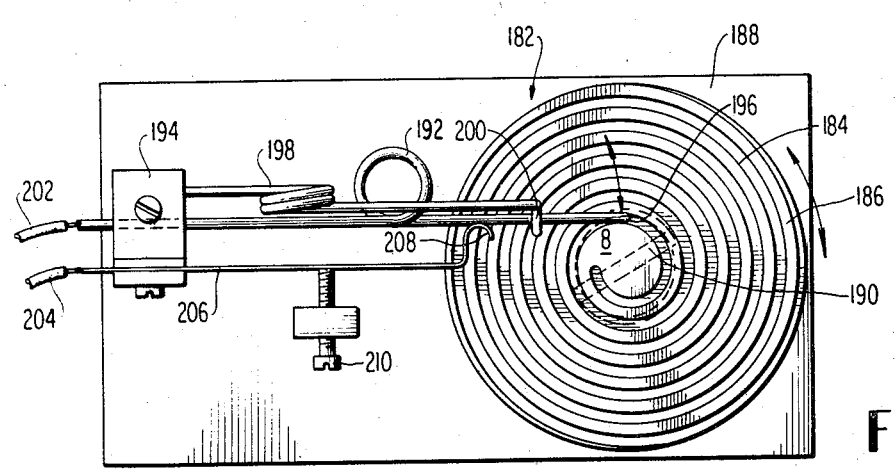
FIG. 16 is an end view of another embodiment of a belt metering switch unit for use with seat-belt retractors of the invention.

A still further embodiment of electric switch units for use in accordance with the invention is shown in FIG. 16. This form of switch is advantageous where high accuracy in precise length of belt movement for signal operation may be required. For example, this might be advantageous in the case of arcraft or in any other vehicle application where it would be desirable for the belt use indicator to operate upon a precise length of withdrawal of the belt from the retractor.

The switch means 182 can be mounted at either side of a belt retractor which has a windup shaft 8. A disc 184 in which a spiral groove 186 is formed in the outer face is journaled for rotation upon a base member 188. The other side of the disc 184 from the grooves 186 will have a lug which can extend into a slot 190 formed in the end of shaft 8 so that when the shaft turns corresponding rotation of the disc 184 will occur. A looped spring arm 192 held in the clamp element 194 is provided at the free end 196 with a depending leg which will ride in the groove 186 of the disc 184. As illustrated by the arrows, rotation of the disc 184 will cause the end 196 of the spring element 192 to move inwardly and outwardly as the shaft 8 is rotated in one direction or the other.

A second spring element 198 is held at one end in the clamp element 194 and has an annular bend 200 in the other end to serve as a steadying member for the arm 192 which is electrically connected at the fixed end to electrical lead wire 202. The second lead wire 204 is electrically connected to the metal spring contact arm 206 so that electrical contact can be made between its end 208 and a slide of the arm 192. When the shaft 8 is rotated to cause the arm 192 to move outwardly, the electrical contact between 192 and 208 will cease when the required length of the belt has been withdrawn from the retractor to which the switch means 188 is attached. Required length of belt to produce the switching action can be controlled by use of adjustment screw 210 which affects the distance the member 192 must move before its contact with 208 ceases. Alternatively, the exact portion of the groove 186 in which the leg depending from end 196 is located when the belt is in the fully retracted position can be varied. Obviously, for a particular installation, further adjustments can be obtained such as by varying the length of the arm 192, the contact member 206, the size of the spiral groove 186 and the like.

Another form of belt metering switch is shown in FIGS. 18-20. Here the switch unit 266 comprises a cap 274, program disc 276, tracking arm 278 and electrical contact means 280. The disc 274 includes a spiral groove 282 in which the end 284 of arm 278 rides so that it reciprocates out relative to central hold 286 when disc 274 turns in one direction and in relative to the hole when the disc turns in the opposite direction. The flat 288 on the hole 286 keys the disc to shaft end 208, so disc 274 turns with shaft 200.

Arm 278 is pivoted at end 290 to the cap 274 and the side 292 of the arm 278 will engage during part of its reciprocal movement the metal blade 294 of the electrical contact 280. Blader 294 extends partially across the inner face 296 of cap 274 through slot 298, is connected to electrical lead wire 300 and held in position by pin 302. Cap 274 has an internal groove 304 which snaps over the ridge 260 of housing 252 thereby holding the switch unit 266 in position upon the retractor.

The switch unit 266 may be grooved to provide either make or break operations upon extension of belt 10, i.e., rotation of disc 274 can either move the side 292 of the arm 278 into or out of contact with blade or plate 294 as shaft 200 rotates upon extension of belt 10. Thus, some applications may require electrical current to pass in lead 300 upon belt extension while others may require current to cease upon a measured length of belt extension. Both faces of disc 276 may carry spiral grooves so that reversal of the disc will provide reverse operation of the switch unit 266. Additionally, the degree of belt extension before make or break of the switch may be adjusted over a wide range of the portion of the groove 282 in which end 284 of arm 278 is positioned for the full retracted mode of the belt retractor.

FIG. 22 illustrates a modification of the switch unit 266 for use when explosive-proof operation is required. The switch of FIG. 19 is changed to substitute the sealed micro-switch 306 for the switch unit 280. However, switching is basically the same with the switch 306 being operated by arm 278 through roller level 308 in the same fashion as described in connection with FIG. 19. A switch unit as shown in FIG. 22 would be useful, for example, in seat-belt systems for aircraft, particularly of the improved design which can both indicate upon a central control panel those seats of the aircraft occupied by passengers and, with the flick of a switch, those occupied seats where a seat-belt remains unfastened as disclosed in my patent U.S. Pat. No. 3,351,381.

Figure 23:
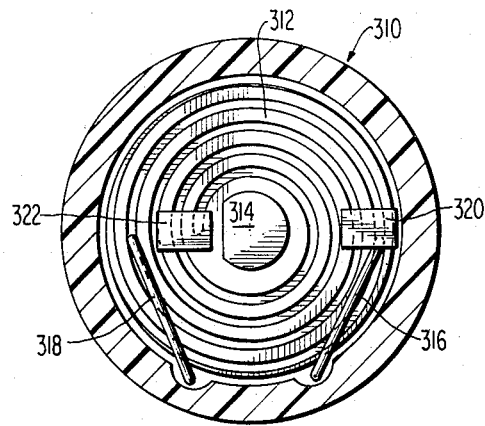
FIG. 23 is a plan view of another form of electric switch means for the belt retractors of the invention.
Figure 9:
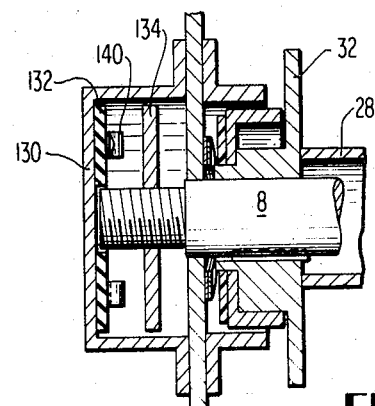
FIG. 9 is a fragmentary side view taken along the line 9—9 of FIG. 4.

FIG. 23 shows one form of metering switch means for the new belt retractors to provide dual circuitry, e.g., to make a circuit through the ignition system of a motor vehicle while breaking a circuit in the audio and/or visual "belt-unfastened" indicator system when the belts at an occupant position of the vehicle have been properly fastened by that occupant. The switch means 310 comprises the grooved disc 312 keyed to the shaft 314, one pivoted arm 316, a second pivoted arm 318, a first electrode member 320 and a second electrode member 322. Electrode 320 and arm 316, for example, would be electrically connected in series to the audio-visual indicator (not shown) and electrode 322 and arm 318 connected in series with the vehicle ignition system. Rotation of the disc 312 on extraction of the belt from a retractor incorporating the switch 310 to the legally required length would turn off the audio-visual indicator and at the same time, make it possible to start the vehicle motor by completing the motor ignition circuit.

CONCLUSION

Any feature of a safety seat-belt system which creates annoyance for the occupant of a vehicle prompts the occupant to ignore the seat-belt and not to put it to use. One of the principal annoyances involved with seat-belt systems in the past has been the inability of the vehicle occupant to have relative freedom of movement when a seat-belt is buckled. This is particularly true in cases where both lap and shoulder belts are buckled about the occupant. Actually, the occupant may be so restrained by the belts as to be prevented from turning about and often the vehicle driver may even be prevented from reaching some of the automobile controls. The seat-belt retractors of this invention eliminate this annoyance in the use of seat-belts. They make it possible for the occupant of a vehicle to have a seat-belt properly fastened about him while he is still permitted to make normal movements, e.g., turning sideways to face a person seated in a rear seat of an automobile, to reach to the opposite side to unlatch a door, to reach into a glove compartment or make other similar movements which are normally done slowly and to a restricted extent by occupants of automobiles. Furthermore, this is accomplished without need to resort to very complicated and expensive devices. Actually, retractors with the roller pawl means imporvement of the invention can be provided at no greater trouble or cost than spring operated retractors of the ratchet type known and used heretofore. These ratchet type retractors have been particularly annoying to vehicle operators because, as previously explained, they gradually retract the belt about a user into a virtually immobile position. A very beneficial result which will be obtained by the provision of the new retractors of this invention, therefore, will be the elimination of annoyances to vehicle occupants with a concurrent motivation for the occupants to properly fasten and use seat-belts which while required as standard equipment by legislation all too often had merely been surplus items.

I claim:

1. In a safety seat-belt retractor device having a frame member by which the retractor may be mounted in a vehicle, a shaft which is rotated to cause a section of belt to wind up for retraction and spring means urging the shaft to turn in a belt retracting direction, an emergency-locking automatic-unlocking and relocking unit which comprises roller pawl means comprising a cam member fixed to said shaft, a circular roller cage member that encircles said cam member, the cage member having a plurality of slots therein, a roller carried in each of said slots to engage a face of said cam member, a resilient ring which encircles said cage member adjacent one end thereof and contacts said rollers through said slots urging the rollers toward said cam member, a circular housing fixed to said frame member that encircles a portion of said cage member and said rollers not encircled by said resilient ring, the inside diameter of said circular housing being larger than the outside diameter of said cage member but smaller than the radial extremity to which said rollers may be moved by said cam member through said slots and friction means between said frame member and said cage member for permitting said cage member to rotate freely upon slow rotation of said cam member by said shaft but resist rotation of the cage member upon rapid rotation of said cam member, whereby said rollers are moved by said cam member through said slots into engagement with said circular housing upon relative rotation of said cam member and said cage member.

2. The seat-belt retractor of claim 1 wherein said resilient ring is a coiled spring ring and said friction means comprises a washer having a face engaging a portion of the cage member.

3. A seat-belt retractor as claimed in claim 1 having a programmed metering electrical switch operatively engaged with said shaft to perform a switching operation upon a predetermined extension of belt from the retractor.

* * * * *